(12) United States Patent
Constin

(10) Patent No.: US 8,631,892 B2
(45) Date of Patent: Jan. 21, 2014

(54) LOAD AND/OR TRANSPORT CART

(76) Inventor: Hans-Peter Constin, Berlin (DE)

(*) Notice: Subject to any disclaimer, the term of this patent is extended or adjusted under 35 U.S.C. 154(b) by 0 days.

(21) Appl. No.: 13/703,279

(22) PCT Filed: Jun. 17, 2011

(86) PCT No.: PCT/DE2011/001312
§ 371 (c)(1),
(2), (4) Date: Mar. 1, 2013

(87) PCT Pub. No.: WO2012/022279
PCT Pub. Date: Feb. 23, 2012

(65) Prior Publication Data
US 2013/0153322 A1  Jun. 20, 2013

(30) Foreign Application Priority Data

Jun. 21, 2010 (DE) .................. 10 2010 024 674
Jun. 16, 2011 (DE) .................. 10 2011 106 561

(51) Int. Cl.
*B62B 3/02* (2006.01)
*B62K 15/00* (2006.01)
*B62K 5/08* (2006.01)

(52) U.S. Cl.
USPC ......... 180/216; 180/208; 180/210; 280/93.51

(58) Field of Classification Search
USPC ............. 280/638, 35, 37, 30, 137.5, 137.501, 280/124.103, 93.502, 93.51, 93.511; 180/208, 210–212, 215, 216
See application file for complete search history.

(56) References Cited

U.S. PATENT DOCUMENTS

| | | | |
|---|---|---|---|
| 3,314,494 A * | 4/1967 | Weitzner | ........................ 180/208 |
| 5,820,146 A | 10/1998 | Van Ligten | |
| 6,520,525 B1 | 2/2003 | Yoon | |
| 6,651,993 B1 | 11/2003 | Emerzian et al. | |
| 2002/0153683 A1* | 10/2002 | Lee | ........................ 280/87.021 |
| 2004/0094919 A1 | 5/2004 | Roder et al. | |
| 2008/0164085 A1* | 7/2008 | Cecinini | ........................ 180/210 |
| 2008/0258416 A1* | 10/2008 | Wilcox | ........................ 280/124.103 |

FOREIGN PATENT DOCUMENTS

| | | |
|---|---|---|
| DE | 81 28 047 | 3/1982 |
| DE | 102 04 478 | 8/2003 |
| DE | 10 2006 042119 | 3/2007 |
| DE | 20 2008 006 764 | 7/2008 |
| EP | 1 704 901 | 9/2006 |
| FR | 2 926 961 | 8/2009 |
| WO | WO-95/08466 | 3/1995 |
| WO | WO-01/72164 | 10/2001 |

* cited by examiner

*Primary Examiner* — Ruth Ilan
(74) *Attorney, Agent, or Firm* — Jordan and Hamburg LLP

(57) ABSTRACT

A load and transport cart includes, under a loading platform, a triangular steering plate and, therebelow, a front part of a footboard, wherein the steering plate has a bore, an annular-segment shaped groove, an elongated hole and two opposing first ball heads. The first ball heads each lie in an articulated manner in a respective bearing at one end of a respective steering lever and, at the other end of each lever is a bearing for a respective further ball head of a respective triangular swinging fork on a stub axle of which a respective front wheel is rotatably mounted, wherein each of the swinging forks is rotatably mounted on the loading platform via pivot pins, and wherein the steering axis is located in front of an imaginary axis and can be deflected to the left or right by the steering angle of 45°.

13 Claims, 22 Drawing Sheets

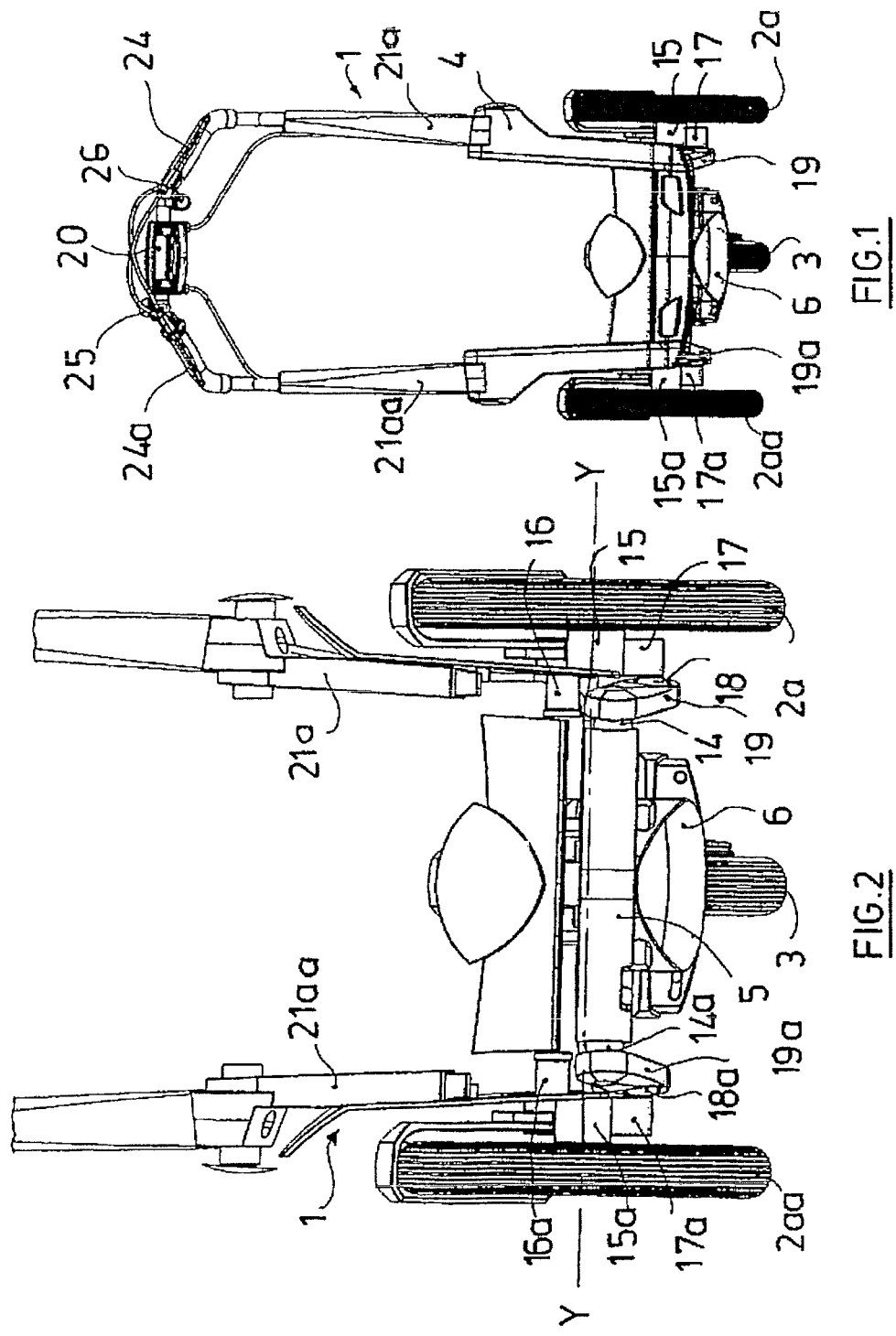

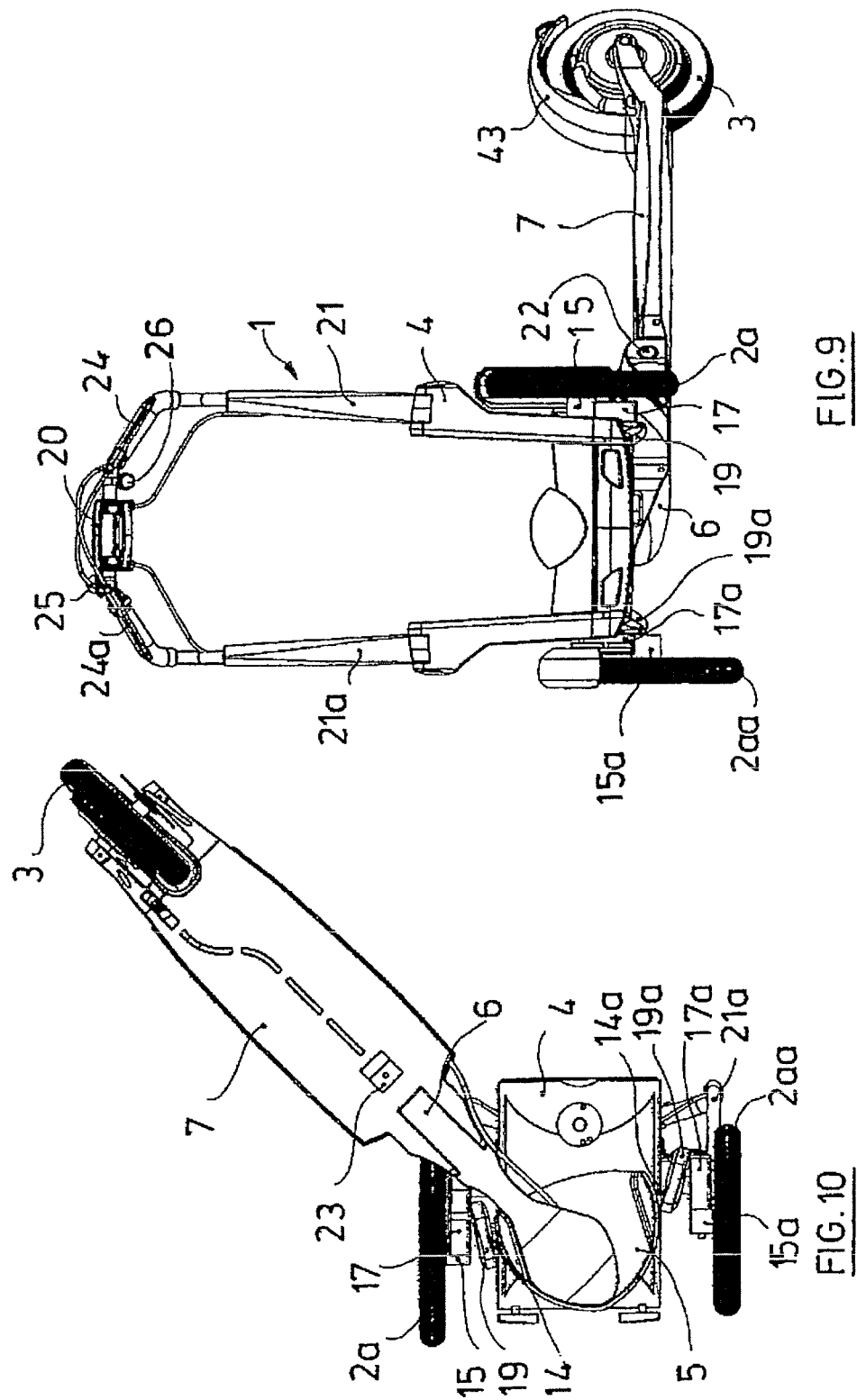

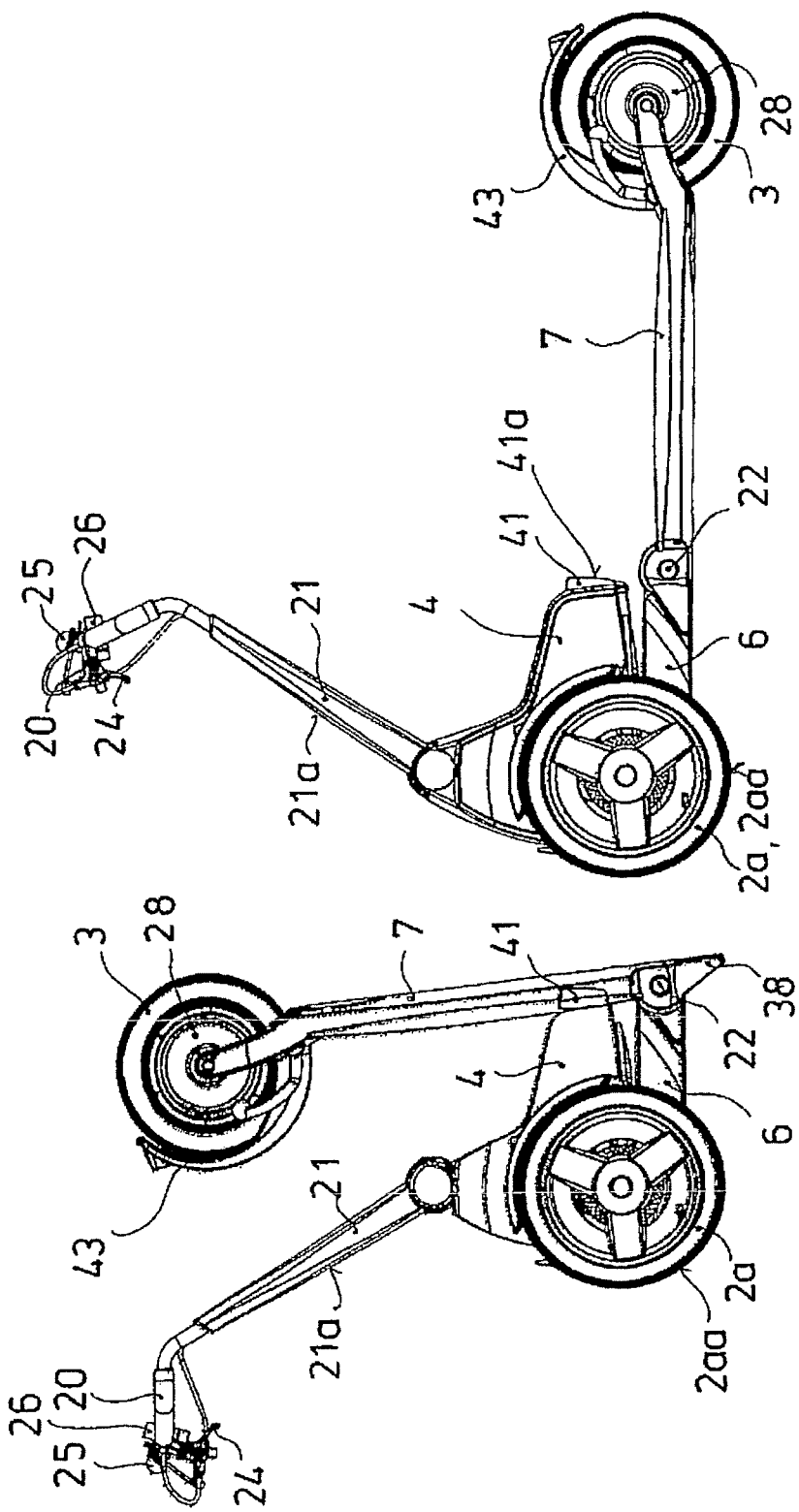

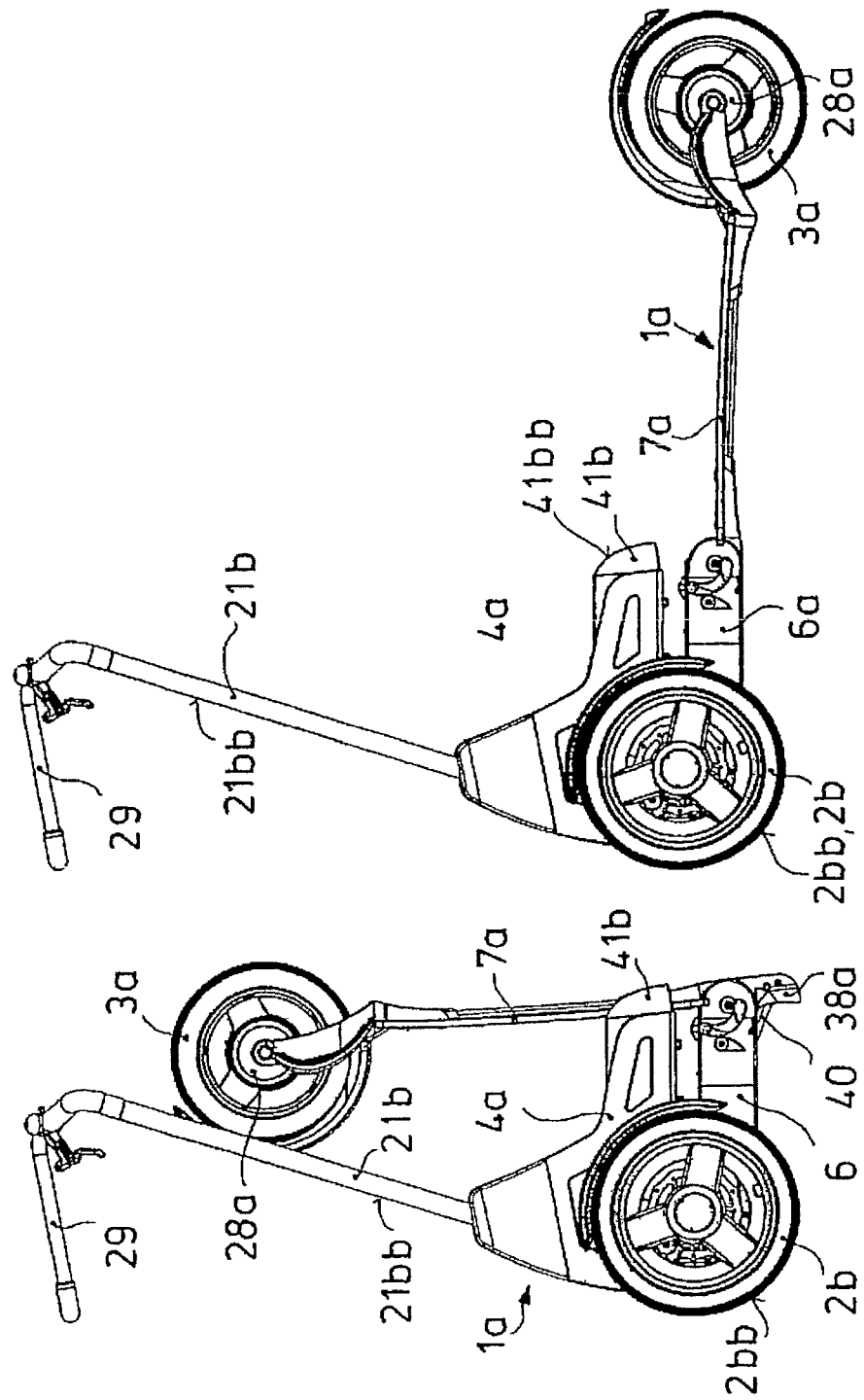

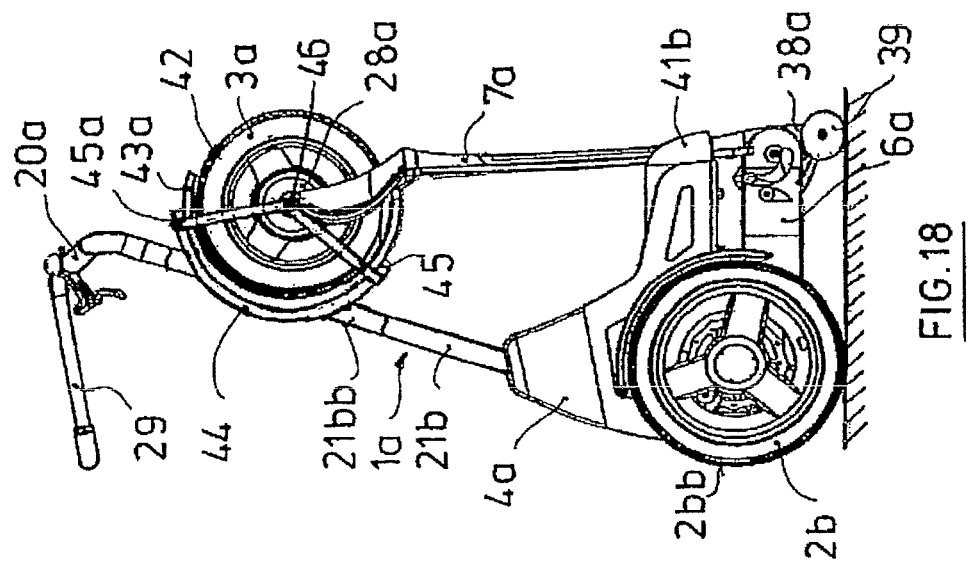
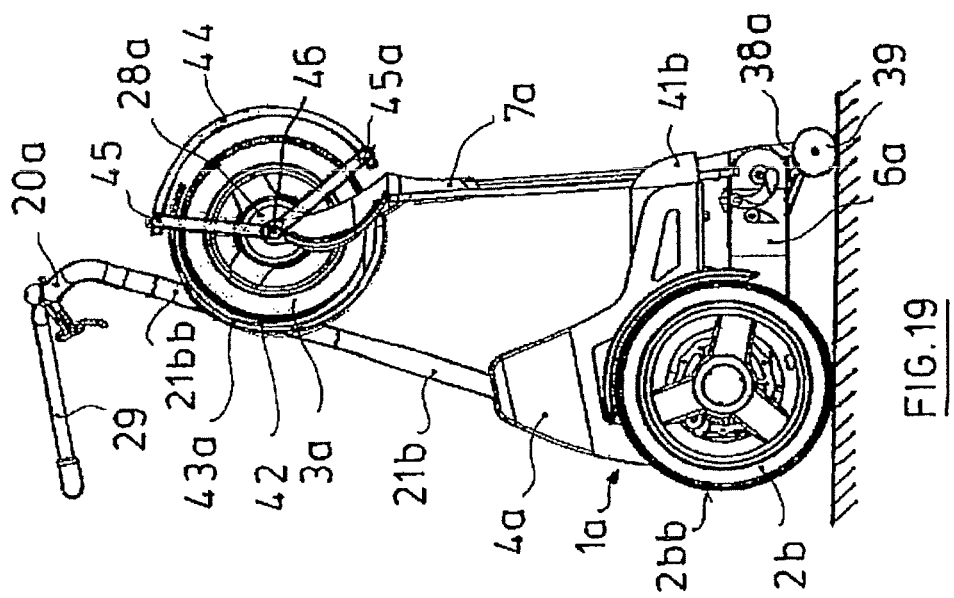

LOAD AND/OR TRANSPORT CART

BACKGROUND OF THE INVENTION

The invention relates to a load and transport cart.

It is known that shopping carts provide great help for transporting purchased goods without the purchased goods having to be carried. However, shopping carts can typically be moved only at the speed of a pedestrian, which greatly limits the range of action of the carts.

A bicycle having a shopping basket or storage bags does enlarge the range of action for transport. This is too bulky, however, and is not suitable for transporting heavy purchased goods such as beverage crates, for example. Conventional scooters and kickboards are likewise not suitable for this.

Document DE 10 2006 042 1129 A1 describes a load cart, which comprises three wheels, a footboard, which can be folded upward, and a loading surface on the front side, on which heavy, bulky loads can be loaded and transported, wherein the front wheels can be slanted relative to the roadway via beveled gear pairs during cornering.

Furthermore, document DE 20 2008 006 764 U1 makes known a support structure equipped with rollers and having at least one gripping element disposed on a rod assembly for guiding the support structure. A skateboard, as a standing board for the user, is associated with the support structure. The gripping element is provided as steering means for the rollers, which are disposed such that these are rotatable about a steering axis extending transversely to at least one axis of the support structure in the steering motion of the support structure.

Furthermore, load carts equipped with three wheels are known from FR 2 926 961 A1 and U.S. Pat. No. 6,520,525 B1.

All these known solutions have the same disadvantage, namely that the rollers do not have a separate drive and are therefore limited in terms of the range thereof, but also require the application of great force to transport heavy, bulky loads, and are even unsuitable for this.

Loading surfaces that are disposed in front of the front wheels (see FR 2 926 961 A1, WO 01/72164A1, EP 1 704 901 A1, WO 95/08466 A1, DE 102 04 478 A1, DE 81 28 047 U1) shift the center of gravity of the load into a position that is not always sufficient for the safety of the roller, and therefore the user must apply appropriate counterforces to prevent the roller from tilting forward.

SUMMARY OF THE INVENTION

The object of the invention is to provide a and transport load cart in the form of a scooter, which ensures a greater range in combination with secure transport of bulky and heavy purchased goods with persons, while further reducing the overall size, improving handling and reducing the amount of force required.

The load and transport cart of the invention in the form of a scooter includes at least three wheels, a handlebar, a loading platform and a footboard which can be folded upward and locked. Two of the wheels are front wheels which are equipped with an inclination mechanism for absorbing centrifugal force during turning. The handlebar is fixedly connected to the loading platform via two steering columns.

In particular, the solution according to the invention is based on the idea of maintaining the lowest possible tilting moment onto the wheels, the tilting moment being caused by the load.

This is achieved in that:

the load and/or transport cart comprises, under the loading platform, a triangular steering plate and, therebelow, a front part of the footboard, wherein the steering plate comprises a bore, in which a round pin of the front part of the footboard lies, an annular-segment shaped groove, in which a steering-pivot pin of the front part of the footboard lies, wherein the steering-pivot pin connects the front part of the footboard to the loading platform in a manner permitting rotation about a steering axis, an elongated hole, in which a round guide pin of the loading platform lies, and two opposing ball heads, wherein each of the ball heads is received in an articulated manner in a bearing at one end of a respective one of two steering levers, wherein said levers each have, at the other end thereof, a bearing for a respective further ball head of a respective triangular swinging fork, each of the forks having a respective stub axle on which a respective one of the front wheels is rotatably mounted, wherein each of the swinging forks is rotatably mounted on the loading platform via pivot pins, and so, when the loading platform is deflected to the left and right about the steering axis via the handlebar, the steering plate presses via the first ball heads onto the steering lever, and so the further ball heads are pressed upward or downward, and so the swinging forks are pressed upward or downward about the pivot pins and, therefore, the front wheels are pressed upward or downward by the same amount but in the opposite direction, and so the two front wheels are slanted to the left or right relative to the roadway during steering, wherein the steering axis is located in front of an imaginary axis and can be deflected to the left or right by the steering angle of 45°.

It is particularly advantageous that the footboard can be rigidly connected to the front part thereof via a sliding element and said footboard can be folded upward about the axis of the front part thereof, about a folding point, wherein the footboard, which has been folded upward in this manner, is securely locked in the position thereof by way of an installed gas pressure spring and laterally in a form-locked manner by way of stops, wherein, in this state, the handlebar is moved forward via the steering column, wherein the fixedly installed handlebar comprises a hand-curve grip for gripping, and a crossbar for reinforcing the steering columns, which are connected to one another at the top via the crossbar, wherein the handlebar is steplessly height-adjustable and lockable, and wherein the footboard can be uninstalled and removed if necessary. This ensures that the load and transport cart according to the invention can form a compact unit for the transport thereof, for example in another vehicle.

It is furthermore advantageous that at least one support wheel or a pair of support wheels is provided at the folding point of the footboard, thereby ensuring that the load and transport cart can still stand on three or four wheels and can be moved with the footboard folded up.

In a preferred variant of the load and transport cart according to the invention, the rear wheel, as the drive wheel, comprises an electric wheel hub motor, wherein the handlebar is provided with two brakes and a bell and a throttle lever for regulating the output of the electric wheel hub motor, wherein regulation takes place by way of an acceleration sensor, which measures the acceleration of the load and transport cart only via the foot thrust of the driver and switches on the wheel hub motor. A drive concept of this type not only ensures that different speeds can be set according to the traffic conditions for transporting the load and/or persons, but also that a substantially greater range can be achieved.

According to a further variant of the load and transport cart according to the invention, all wheels of the load and/or transport cart have electric wheel hub motors.

Furthermore, according to the invention, only the two front wheels are equipped with electric wheel hub motors, whereby the thusly designed load and transport cart has a front drive, wherein, by way of electronics, the inner wheel rotates more slowly than the outer wheel in the curve in accordance with the steering. Alternatively, however, the two front wheels can be driven by only one motor, which is connected to the wheels via a differential gearbox.

The load and transport cart according to the invention can therefore be designed in a variable manner for different drive forms.

In a further embodiment of the load and transport cart according to the invention, the rear wheel comprises a fixedly installed guard plate and an additional guard plate, which is installed over the guard plate and is supported via a rod assembly such that it is rotatable about the rear wheel axle, and so the tire of the rear wheel is covered by swiveling the additional guard plate when the footboard is folded upward. This allows for prevention of soiling by the rear wheel.

Furthermore, it is particularly advantageous that the load cart comprises a foldable and height-adjustable support for the seat of the driver, wherein the support is formed of a U-shaped arch having two legs and a backrest in the center, and two tubular bars, into which the legs are slid and are height-adjustable and lockable, wherein the tubular bars are rotatably supported in bearing blocks, which are fixedly mounted on the footboard, wherein the tubular bars are fixed in the vertical position and in the folded position, and wherein a saddle instead of the backrest can be installed for the seat.

Further advantages and details will become apparent from the description that follows, with reference to the attached drawings.

BRIEF DESCRIPTION OF THE DRAWINGS

FIG. 1 shows a front view of the load and transport cart for straight-ahead travel, FIG. 2 shows an enlarged depiction of the gearbox of the front wheels for straight-ahead travel, FIG. 9 shows a front view of the load and transport cart in the steered state of 45° to the left, FIG. 10 shows a bottom view of the load and transport cart in the steered state of 45° to the left, FIG. 12 shows a handlebar position in the driving state of the load and transport cart, FIG. 13 shows a handlebar position of the load and transport cart in the state serving as a shopping cart, FIG. 14 shows a view of an alternative handlebar having a hand-curve grip provided in the center, FIG. 15 shows the load and transport cart according to FIG. 14 in the upward-folded state of the footboard, FIG. 18 shows a view of the load and transport cart having an additional guard plate, FIG. 19 shows the load and transport cart having additional guard plate in the closed state.

DETAILED DESCRIPTION OF THE INVENTION

First Exemplary Embodiment

Figure 3:
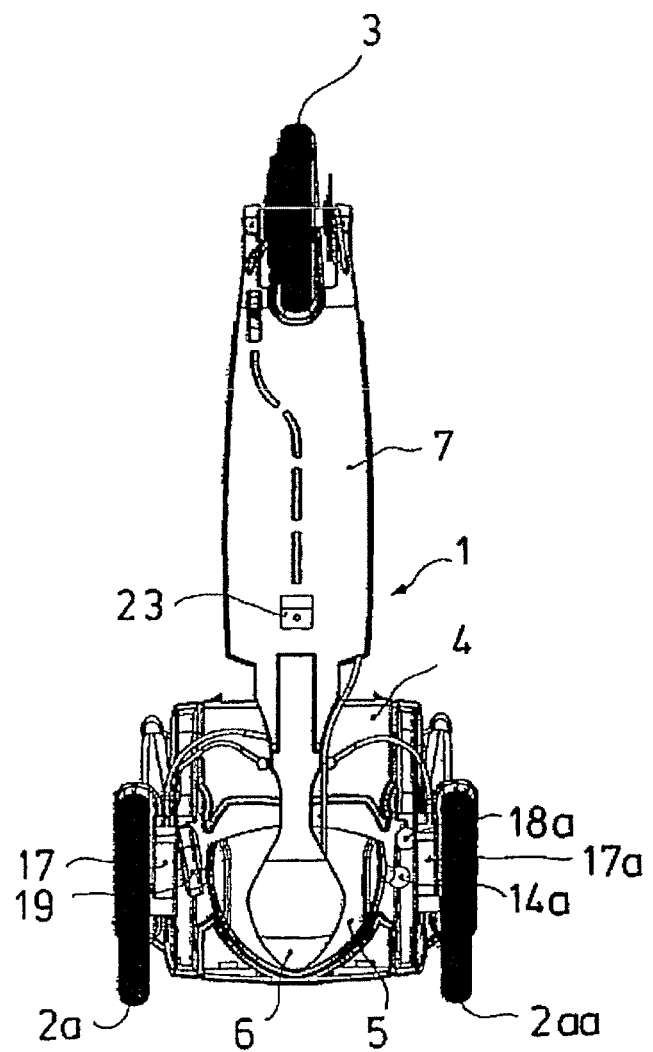
FIG. 3 shows a bottom view of the load and transport cart for straight-ahead travel.
Figure 4:
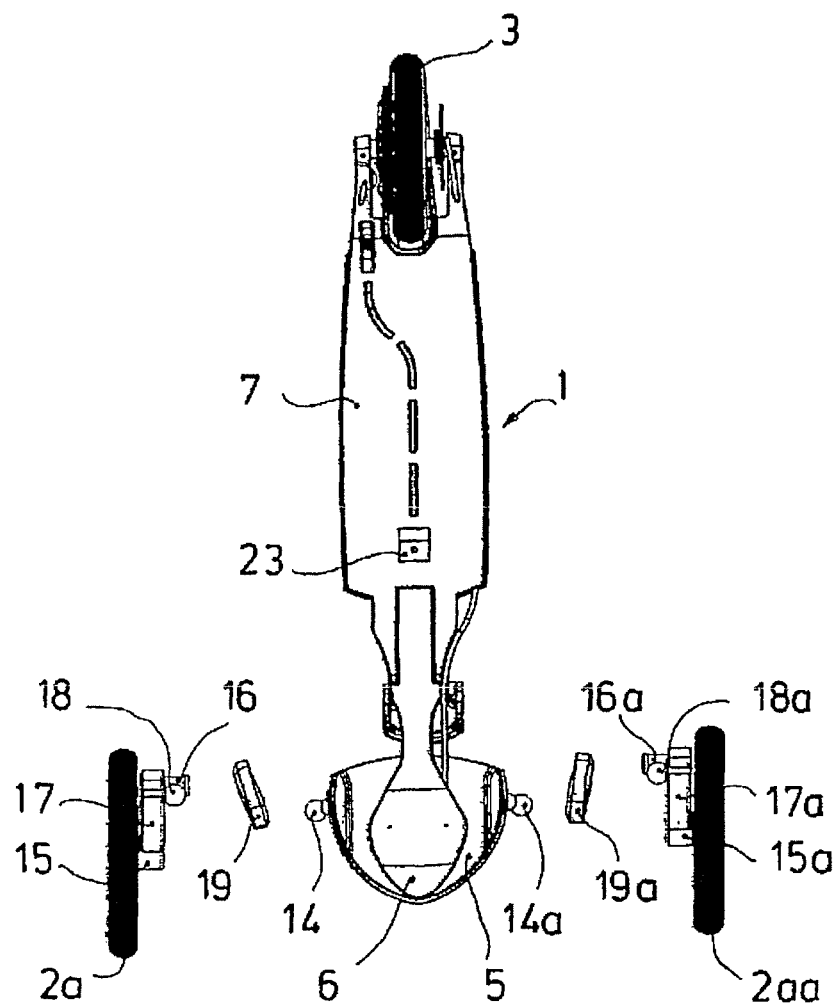
FIG. 4 shows an exploded view of the gearbox of the load and transport cart.
Figure 5:
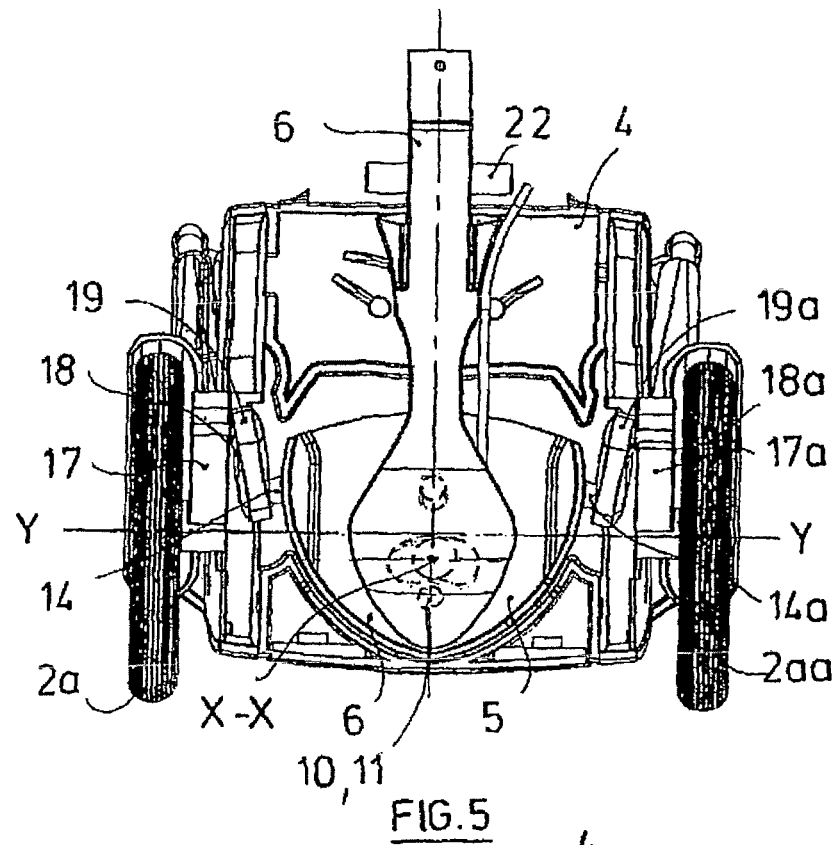
FIG. 5 shows a bottom view of the load and transport cart comprising footboard for straight-ahead travel.

FIGS. 1 to 4 show the basic design of the load and transport cart 1 according to the invention comprising two front wheels 2a, 2aa and the rear wheel 3. The loading platform 4 is located between the two front wheels 2a and 2aa. A triangular steering plate 5 is disposed under the loading platform 4, under which the front part 6 of the footboard 7 is located. The loading platform 4 is rotatably connected via a steering-pivot pin 8 to the front part 6 of the footboard 7.

The steering plate 5 comprises an annular-segment shaped groove 9, in which the steering-pivot pin 8 of the front part 6 of the footboard 7 lies, a bore 10, in which a round pin 11 of the front part 6 of the footboard 7 lies, an elongated hole 12, in which the round guide pin 13 of the loading platform 4 lies, and two ball heads 14 and 14a, which are located opposite one another at the edge in rear corners (see FIGS. 5 to 8).

The two front wheels 2a and 2aa are rotatably mounted on the stub axles 15 and 15a of the triangular swinging forks 17 and 17a, which are pivotably mounted via a pivot pin 16 and 16a, respectively, on the loading platform 4. The swinging fork 17 and 17a has a ball head 18 and 18a, respectively. The steering lever 19 and 19a connects the ball head 14 to the ball head 18, and the ball head 14a to the ball head 18a, respectively, and so the front wheels 2a and 2aa are respectively hinge-connected to the steering plate 5.

Figure 6:
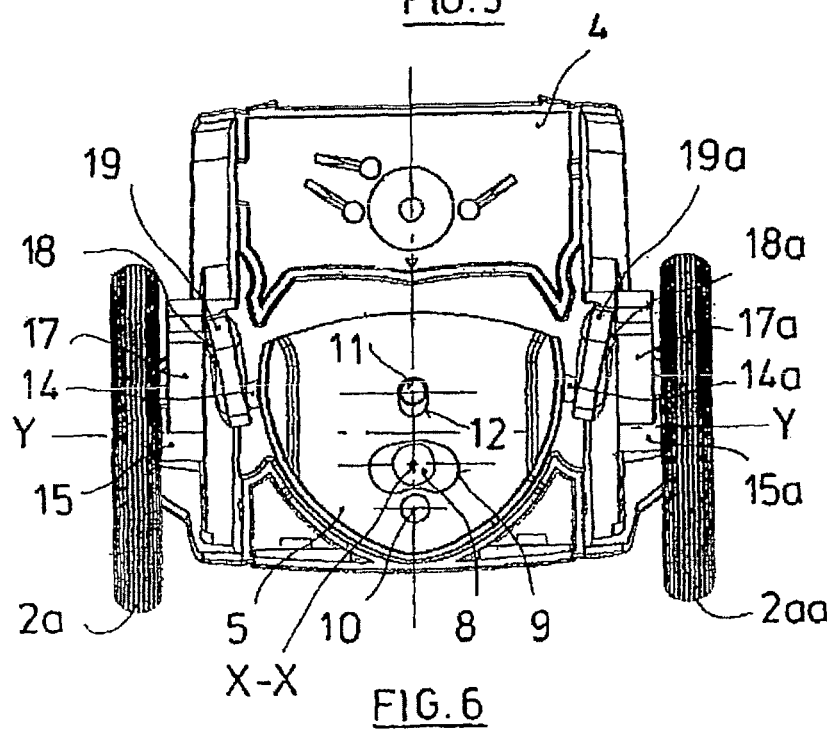
FIG. 6 shows a bottom view of the load and transport cart without the front part of the footboard.
Figure 7:
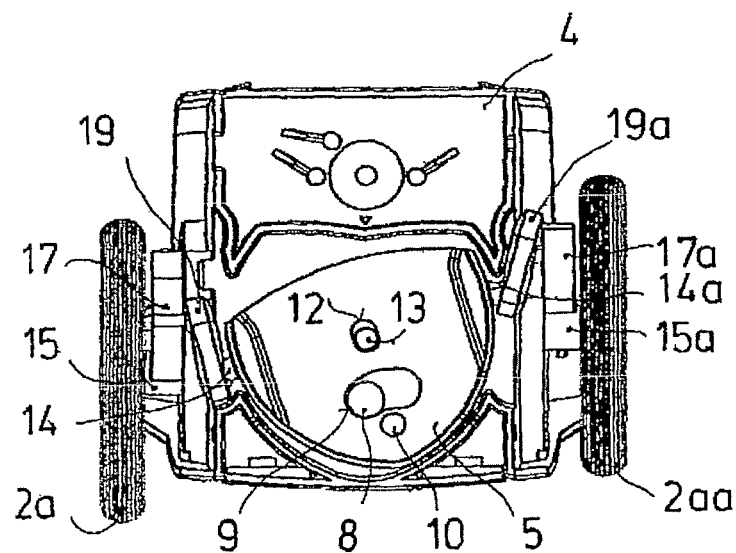
FIG. 7 shows a bottom view of the load and transport cart without the front part of the footboard, with steering 45° to the left.
Figure 8:
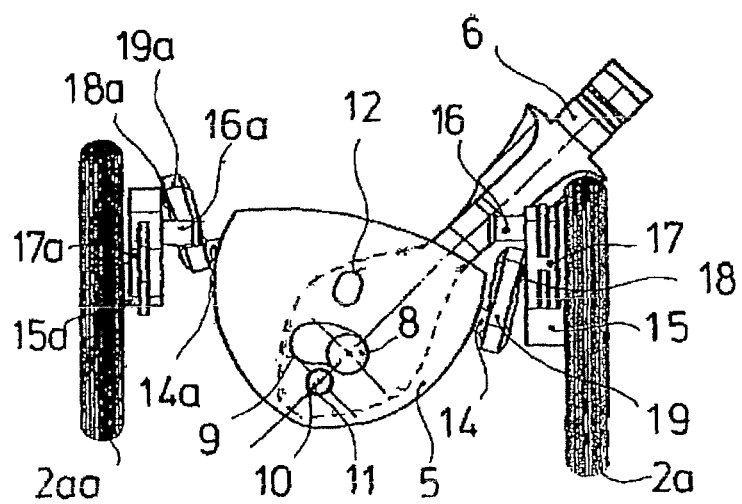
FIG. 8 shows a top view of the load and transport cart without the loading platform, with steering 45° to the left.

The handlebar 20, which is fixedly connected to the loading platform 4 via the two steering columns 21a and 21aa, can steer the two front wheels 2a and 2aa to the left or right, the vertical steering axis X-X of the steering-pivot pin 8 being located in front of the imaginary axis Y-Y of the two front wheels 2a, 2aa (see FIG. 6).

The inclination mechanism of the two front wheels 2a and 2aa during steering functions is described in the following. Since the steering plate 5 is pivotably mounted via the bore 10 on the pin 11 at the front part 6 of the footboard 7 and can be swiveled back and forth via the elongated hole 12 on the guide pin 13 of the loading platform, the two ball heads 14 and 14a move substantially on a straight line, but in opposite directions when, during steering while cornering, the loading platform 4 is rotated to the right or left, for example, relative to the front part 6 of the footboard 7. The ball head 14a of the steering plate 5 moves forward or backward and presses the front wheel 2a upward or downward via the steering lever 19a and the swinging fork 17a. At the same time, however, the ball head 14 or 14a of the steering plate 5 moves backward or forward by the same amount and, via the steering lever 19 and the swinging fork 17, presses the front wheel 2aa downward or upward, and therefore the loading platform 4 is slanted to the right or left, respectively, relative to the roadway, wherein the steering angle of the steering plate 5 is limited via the annular-segment shaped groove 8 to the stop by way of the steering-pivot pin 8 by 45° to the right and left when the load cart is thrust forward via the foot thrusts.

The two front wheels 2a, 2aa are slanted relative to the roadway during cornering by way of the thusly designed gearbox, thereby enabling the load and transport cart 1 to counteract the centrifugal force acting in the curve. In this manner the loaded load and transport cart 1 can be safely steered in the curve (see FIGS. 9 and 10).

The footboard 7, on which the driver comfortably stands with one leg, is hinge-connected at the front part 6 via an axle 22 (FIG. 9 to FIG. 13), thereby enabling the footboard 7 to be folded upward or detached for deinstallation, as necessary. During driving, the footboard 7 is rigidly connected in a fixed manner at the front part 8 by way of a sliding element 23 to form one unit (FIG. 10).

Figure 11:
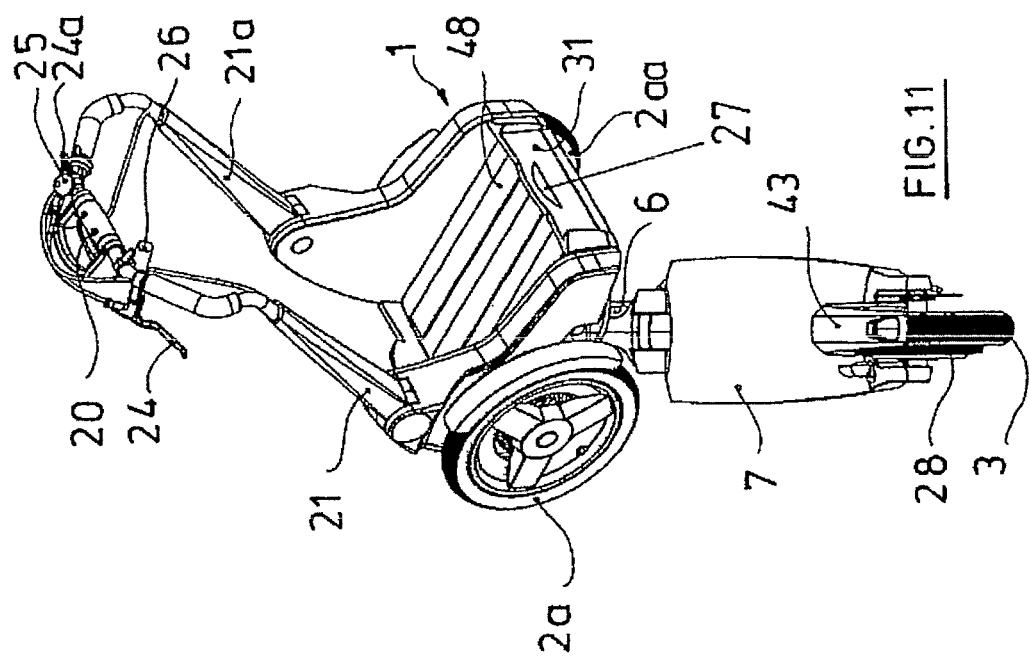
FIG. 11 shows a perspective view of the load and transport cart in the steered state.

FIG. 11 shows the position of the box 31 for accommodating the rechargeable batteries 27 provided for supplying power to the wheel hub motor 28. The box 31 is located underneath the loading platform 48.

FIG. 12 shows the position of the locked steering column 21a and 21 as in the driving state, in which the driver can comfortably grip the handlebar 20 and steer the two front wheels 2a and 2aa. In the event that the load and transport cart 1 is intended to be used as a shopping cart, the steering column 21a and 21 as can be shifted forward and locked, with the footboard 7 folded upward or deinstalled, thereby enabling the shopping cart to be better and comfortably pulled by hand.

The handlebar 20 comprises a left and a right hand brake 24a and 24aa, respectively, a bell 25 and a throttle lever 26, via which the power demand of the wheel hub motor 28 can be regulated, said wheel hub motor being installed as a drive wheel on the rear wheel 3 (see FIGS. 9 to 13).

Second Exemplary Embodiment

FIGS. 14 to 27 show an alternative embodiment of the load and transport cart according to the invention. To permit the reference characters to be distinguished from those of the first exemplary embodiment, an additional letter identifier is provided for reference characters that are otherwise the same.

The arrangement of loading platform, triangular steering plate, front part of the footboard, ball heads and swinging forks described in the first exemplary embodiment is the same.

Figure 16:
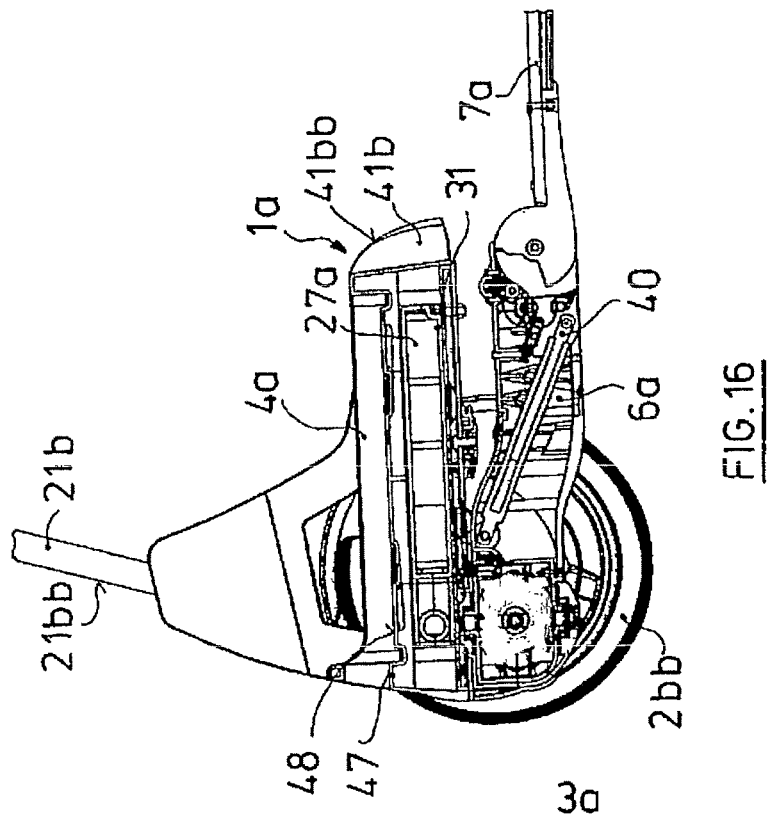
FIG. 16 shows a longitudinal view through the load and transport cart.
Figure 17:
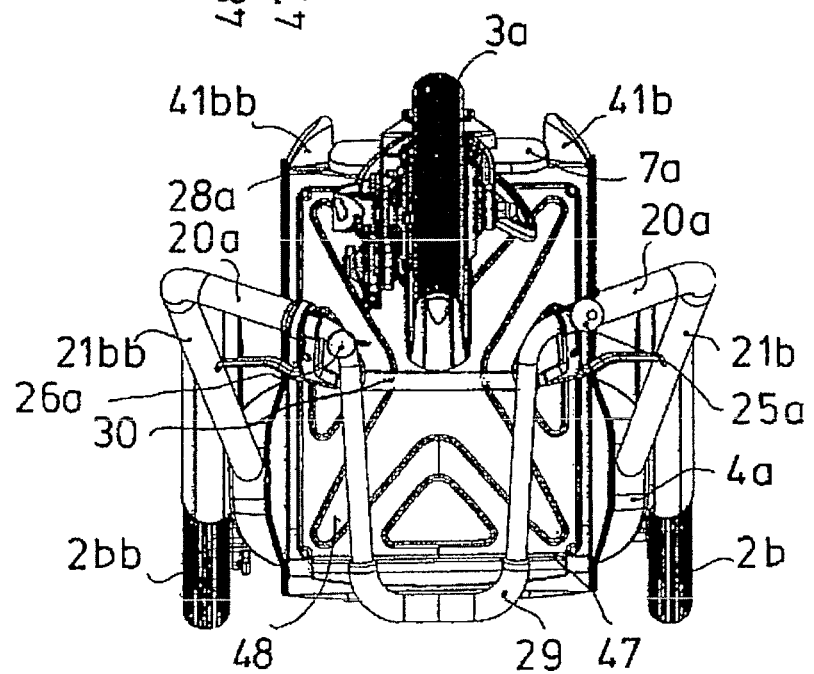
FIG. 17 shows a top view according to FIG. 14.

FIGS. 14 to 16 show the load and transport cart 1a comprising the steering columns 21b and 21bb. As shown in FIG. 17, the load and transport cart 1a has a fixed handlebar 20a, which has a forwardly directed hand curve 29 in the center.

If the load and transport cart 1a is converted into a shopping cart by folding up and removing the footboard 7a, the shopping cart can be comfortably gripped and pulled by hand via the hand curve 29 without having to adjust the steering column 21b and 21bb. A crossbar 30 that connects the two steering columns 21b and 21bb at the top can be installed in order to stiffen the hand-curve grip 29. The handlebar 20a is height-adjustable and lockable in order to adapt the load cart 1a for transport, for example in the trunk of a car.

To ensure that the folded-up footboard 7a is securely held in the position thereof, a gas pressure spring 40 (FIG. 16) is provided, wherein the footboard 7a is secured in a form-fit manner on the side via the stops 41a and 41 as of the front part 6a.

As shown in FIGS. 18 and 19, the footboard 7a comprises a small support wheel or a pair of support wheels 39 at the folding point 38a. These make it possible to pull the load and transport cart 1a with the footboard 7a folded up without the need to tilt the load and transport cart 1a into a slanted position. In this case, the shopping cart stands on three or four wheels and can be rolled. In order to prevent the load cart 1a from accidentally rolling, for example on a downhill surface, the brakes 24b and 24bb provided for the front wheels 2b and 2bb can be actuated or locked.

The rear wheel 3a comprises, in addition to the fixed guard plate 43 provided, an additional guard plate 44, which lies above the guard plate 43 and is held in this position by way of the rod assembly 45 and 45a (see FIG. 18). The rod assembly 45 and 45a is rotatably supported on the rear wheel axle 46, and so the additional guard plate 43 can be pivoted over the tire 42 of the rear wheel 3a, which is exposed and possibly dirty in the folded-up state of the load and transport cart 1a, and therefore the tire 42 is covered and no longer visible (see FIG. 19).

Reference is made to FIG. 16 once more. A box 31a for the rechargeable batteries 27a is located on top of the loading platform 4a, said rechargeable batteries supplying current to the wheel hub motor 28a installed at the rear wheel 3a. The rechargeable batteries 27a are covered by a cover 47, above which the loading surface 48 for placement of the purchased goods is located. The cover 47 and the rechargeable batteries 27a are designed such that the cover 47 is easy to open and the rechargeable batteries 27a can be easily installed and removed.

Figure 20:
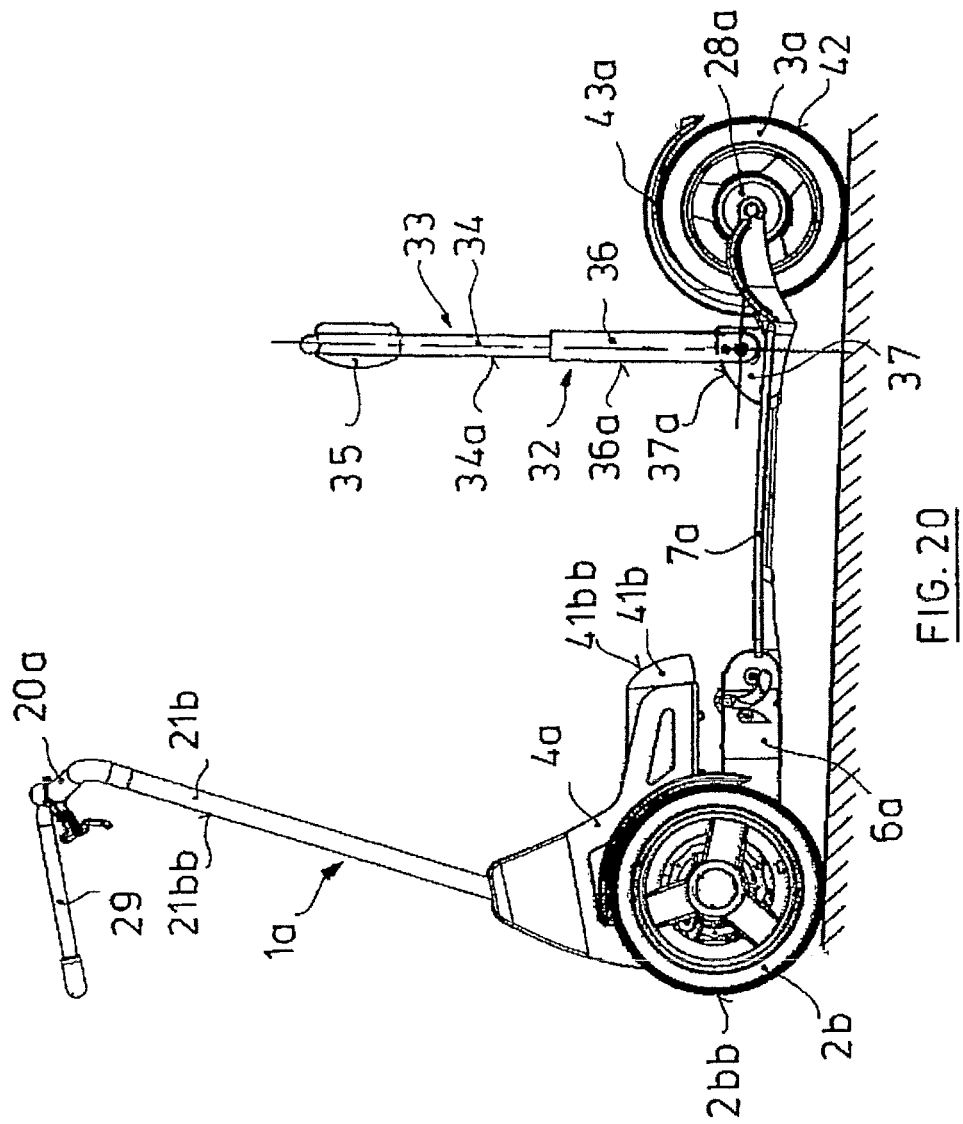
FIG. 20 shows the load and transport cart having an adjustable and foldable support for the driver, in the upward-folded state.
Figure 21:
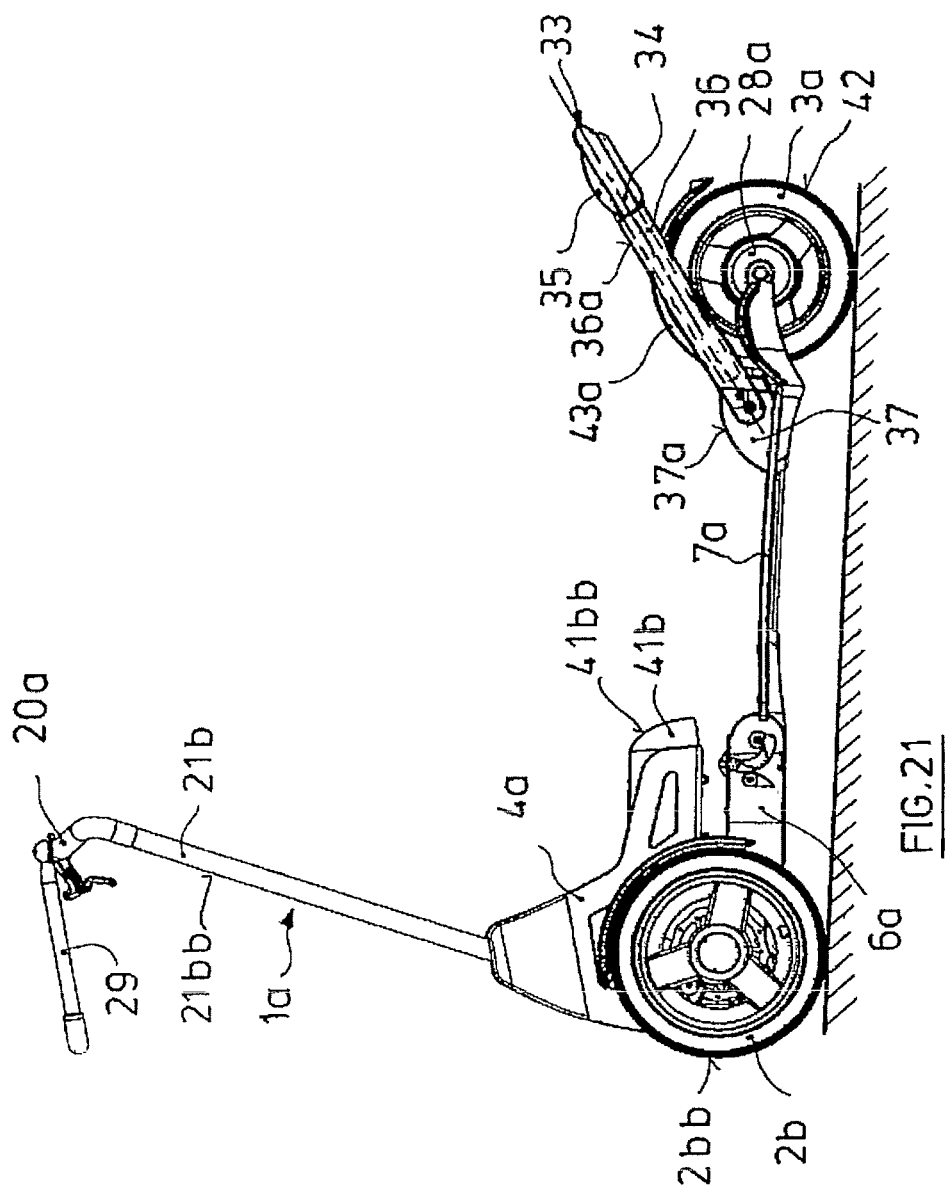
FIG. 21 shows the load and transport cart according to FIG. 20 with the support closed.
Figure 22:
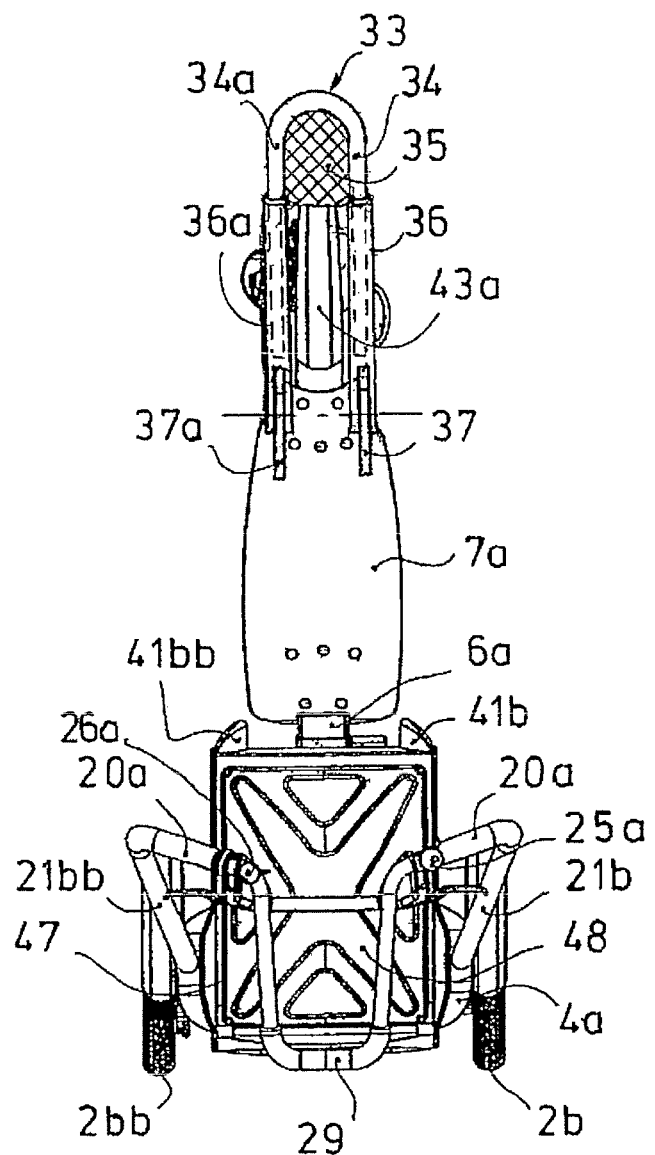
FIG. 22 shows a top view of the load and transport cart according to FIG. 21

If the travel distance is long, it is advantageous to provide a foldable and height-adjustable support 32 for the driver. FIG. 20 shows the support 32 in the swung-up state and FIG. 21 shows said support in the swung-down state.

The support 32 is formed of a U-shaped arch 33 having two legs 34 and 34a and a backrest 35 in the center, and two tubular bars 36 and 36a, in which the legs 34 and 34a are slid without play and are height-adjustable and lockable. The tubular bars 36 and 36a are rotatably supported in bearing blocks 37 and 37a, which are fixedly mounted on the footboard 7a, wherein the tubular bars 36 and 36a are lockable in the vertical position (see FIG. 20) and in the swung-down position (FIG. 21) by way of a spring-bolt system, for example. As an alternative to the backrest 35, a saddle for the seat can also be installed.

In the case of electric drive via the wheel hub motor 28a, the pedelecs principle is used to regulate the motor output. Therein, the electric drive is designed such that this is activated only when the driver himself steps. In other words, the wheel hub motor 28a functions only when the load and transport cart 1a is intentionally accelerated. The driver must also step occasionally during travel, otherwise the electric drive is throttled, which ultimately causes the load and transport cart to stop, the wheel hub motor 28a not being activated when the load and transport cart is at a standstill and the throttle lever 26a is intentionally accelerated. These measures serve to prevent accidents during use of the load and transport cart 1a resulting from an incorrect application of drive power or incorrect operation.

To this end, an acceleration sensor is provided, which detects acceleration of the load and transport cart and triggers activation of the wheel hub motor 28a. If acceleration is not detected, the wheel hub motor 28a switches off.

As an alternative to driving by way of the rear wheel 3a, all wheels of the load and transport cart can be equipped with wheel hub motors 28a, so that the load and transport cart 1a has all-wheel drive for poor street conditions. By way of the all-wheel drive, the two front wheels 2b and 2bb can be regulated by electronics via the steering in such a way that the inner front wheel rotates in an adapted slower manner with respect to the outer front wheel when the load cart 1a travels in a curve.

The two front wheels 2b and 2bb can also be driven by only one motor, which is connected to the wheels via a differential gearbox.

Figure 23:
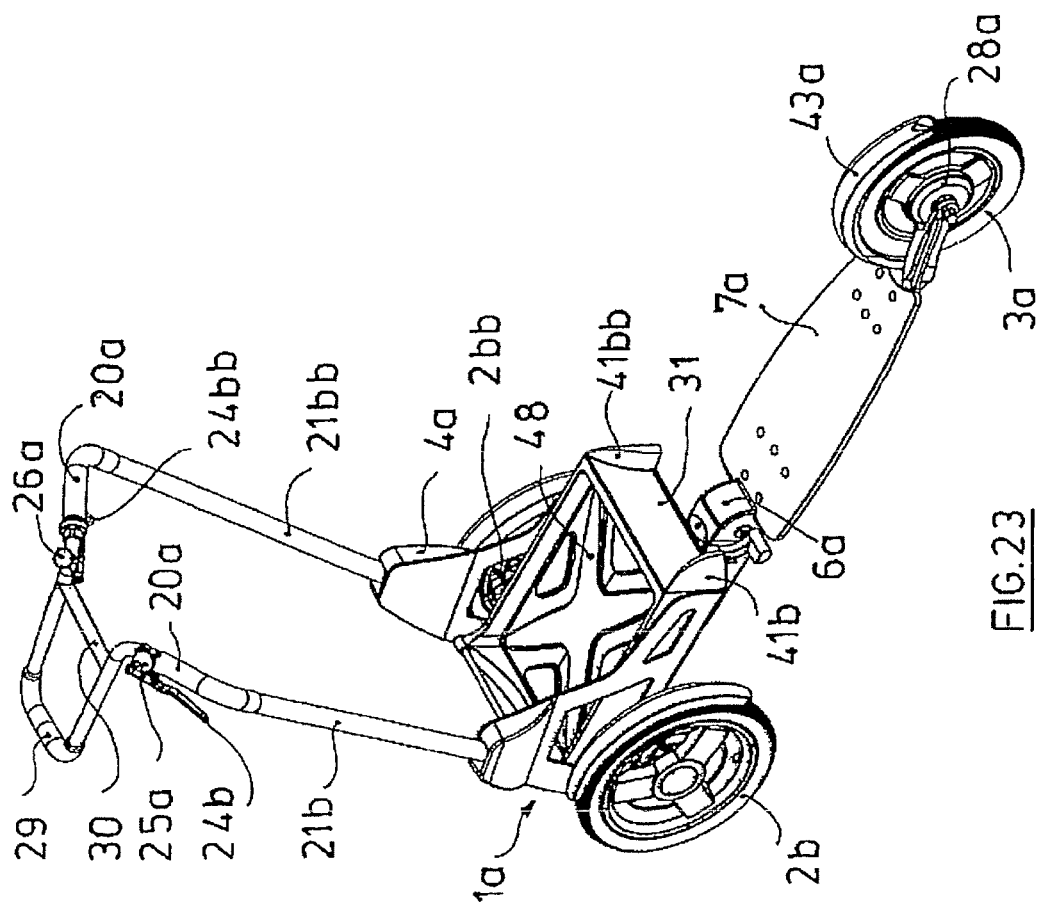
FIG. 23 shows a perspective view of the load and transport cart in the non-loaded state.
Figure 24:
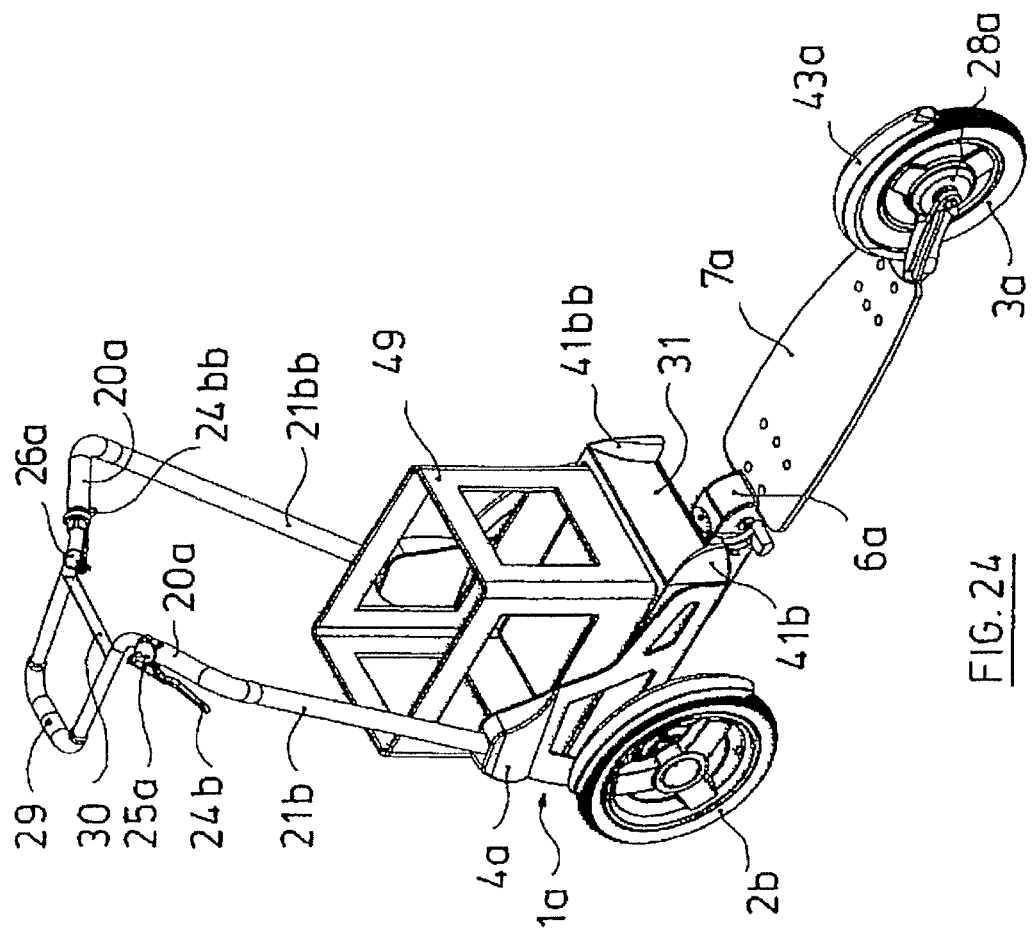
FIG. 24 shows a perspective view of the load and transport cart having a beverage crate on the loading surface.
Figure 25:
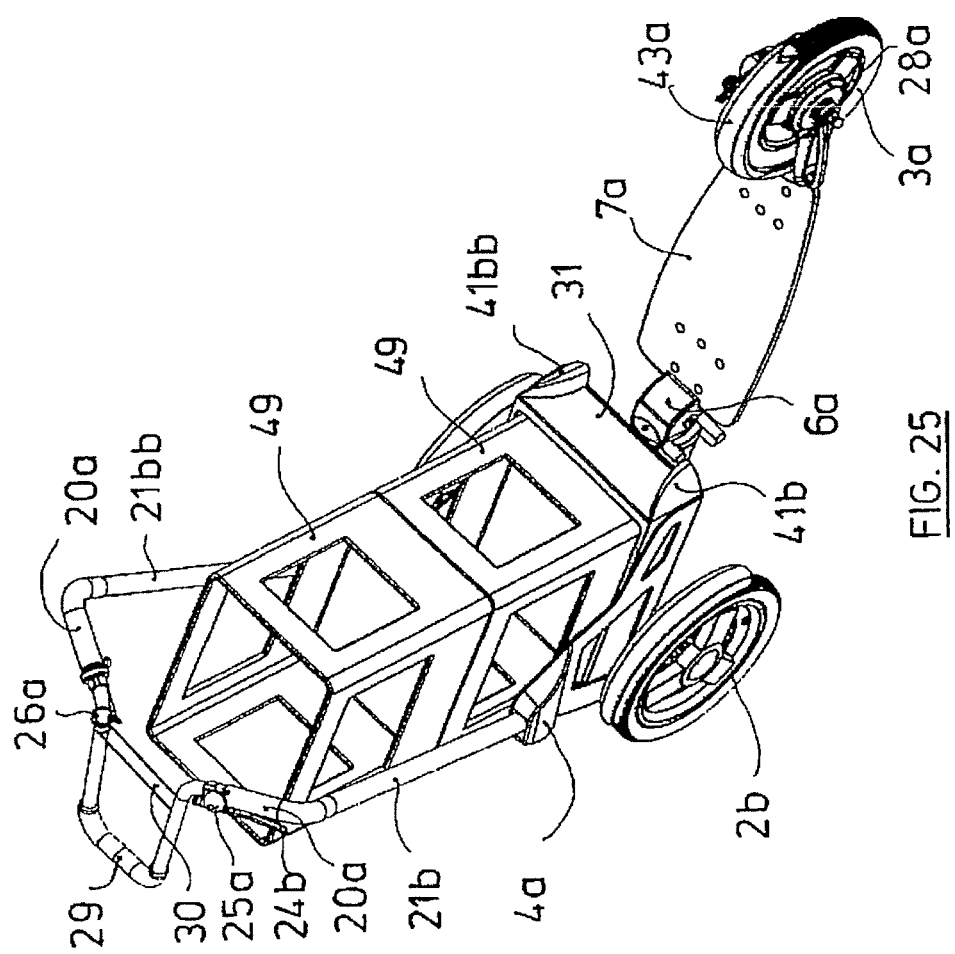
FIG. 25 shows a perspective view of the load and transport cart having two beverage crates stacked one on top of the other on the loading surface.

The loading surface 48 of the load cart 1a is sized such that a large, heavy beverage crate 49 can be accommodated and easily loaded and unloaded. FIG. 23 shows the load and transport cart 1a in the unloaded state, FIGS. 24 and 25 show said load cart in the loaded state. As shown in FIG. 25, it is also possible to transport two heavy beverage crates 49 stacked on top of one another using the load and transport cart 1a.

Figure 26:
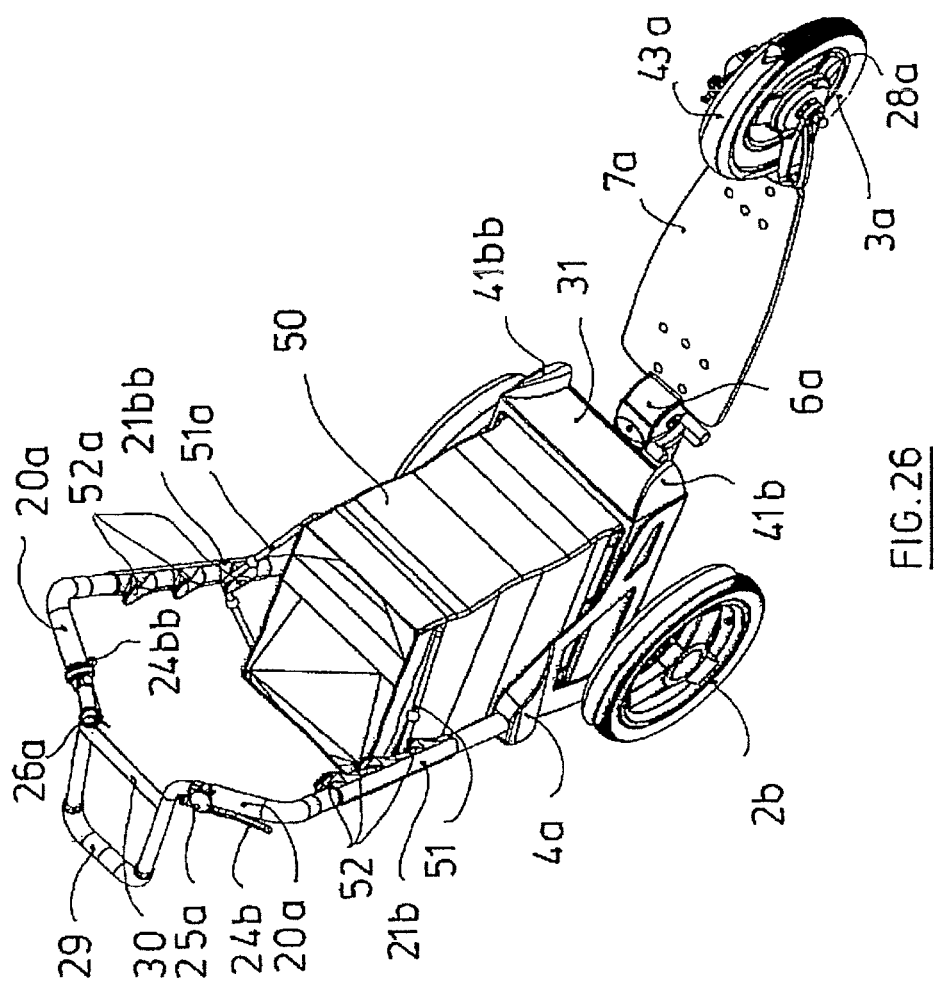
FIG. 26 shows a perspective view of the load and transport cart having a shopping bag on the loading surface.

As shown in FIG. 26, a shopping bag 50 is provided for small goods, the shopping bag being self-foldable by way of installed spring wires and having two handles 51 and 51a. Depending on the quantity of goods, the handles 51 and 51a can be hung on the hooks 52 and 52a located on the steering columns 21b and 21bb, thereby enabling the goods to be transported in a securely accommodated manner.

Instead of hooks 52 and 52a, the shopping bag 50 can also be steplessly hung on the steering columns using adjustable sliding elements.

Figure 27:
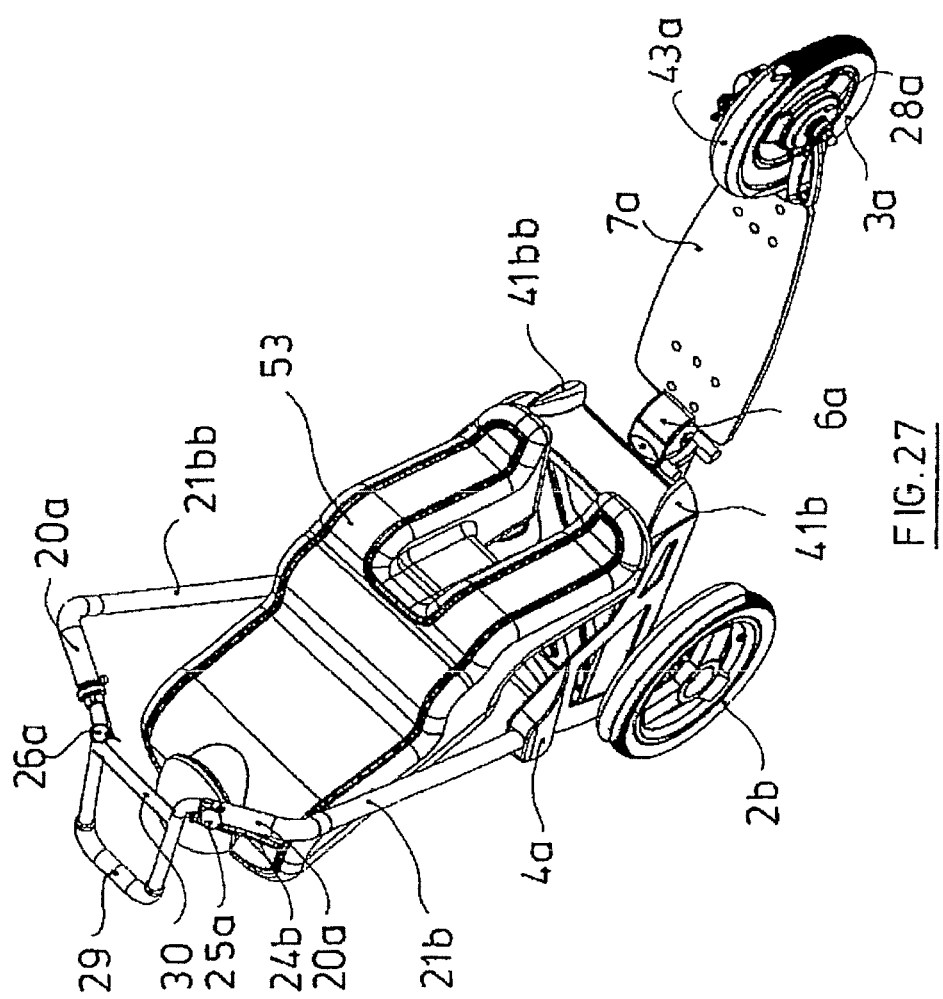
FIG. 27 shows a perspective view of the load and transport cart having a baby basket on the loading surface.

FIG. 27 shows a baby basket 53 or a seat for a small child installed on the loading surface 48, as an alternative to the shopping bag 50, thereby enabling the load and transport cart 1a to also be used to transport a baby or a small child, for example while taking a walk.

Figure 28:
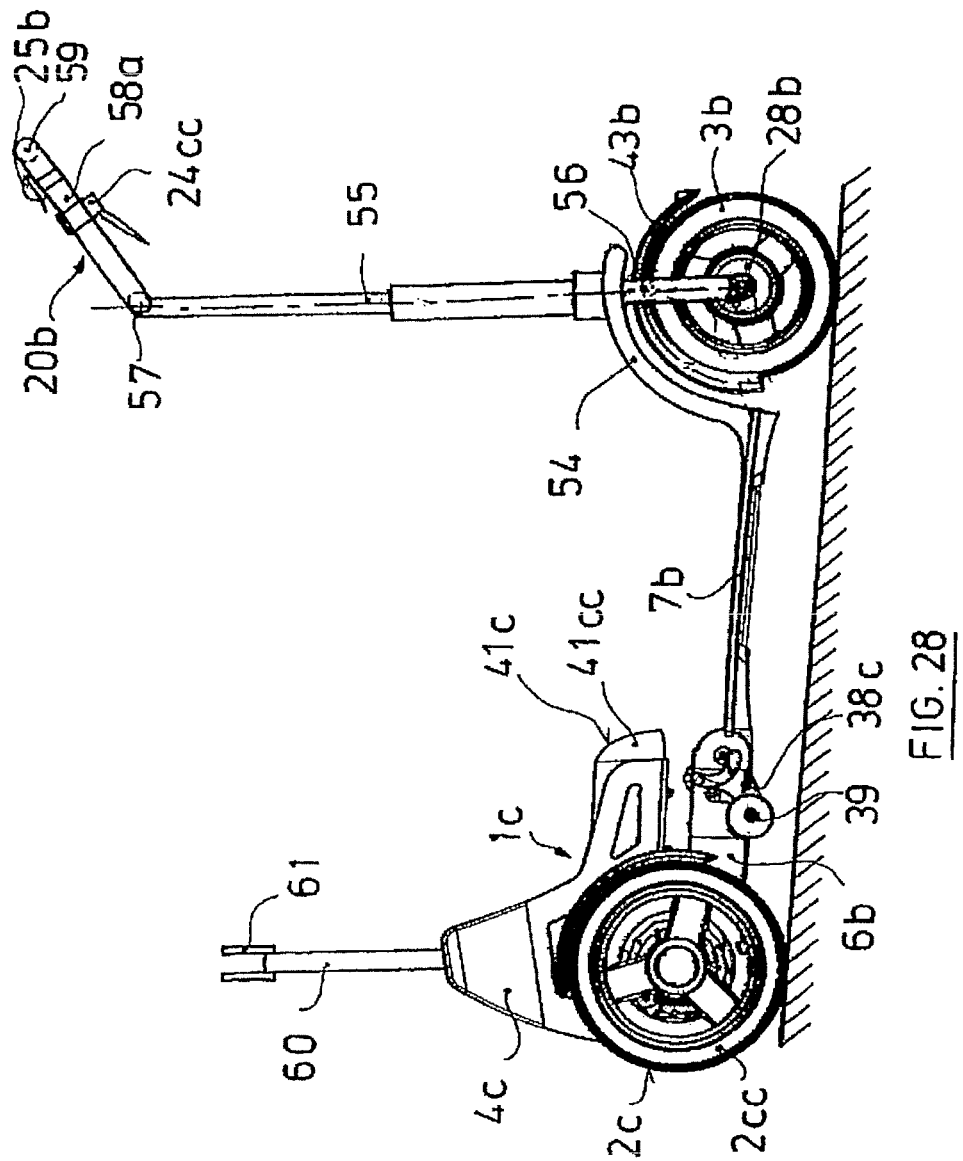
FIG. 28 shows a side view of a load and transport cart having a rear wheel driving forward.
Figure 29:
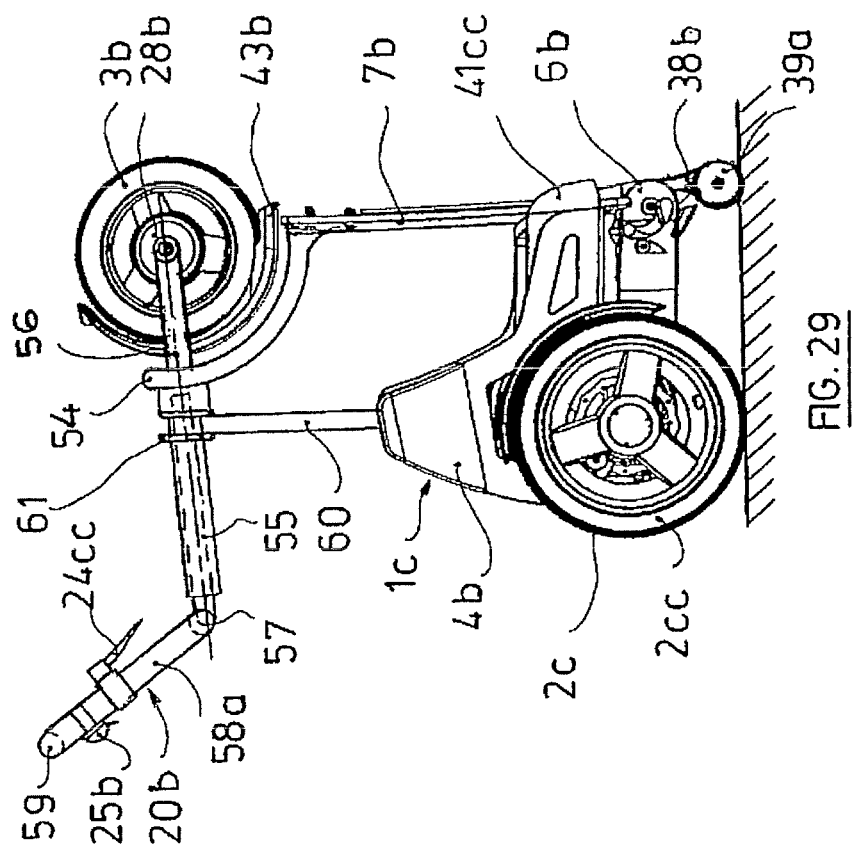
FIG. 29 shows the load and transport cart according to FIG. 28 in the upward-folded state.
Figure 30:
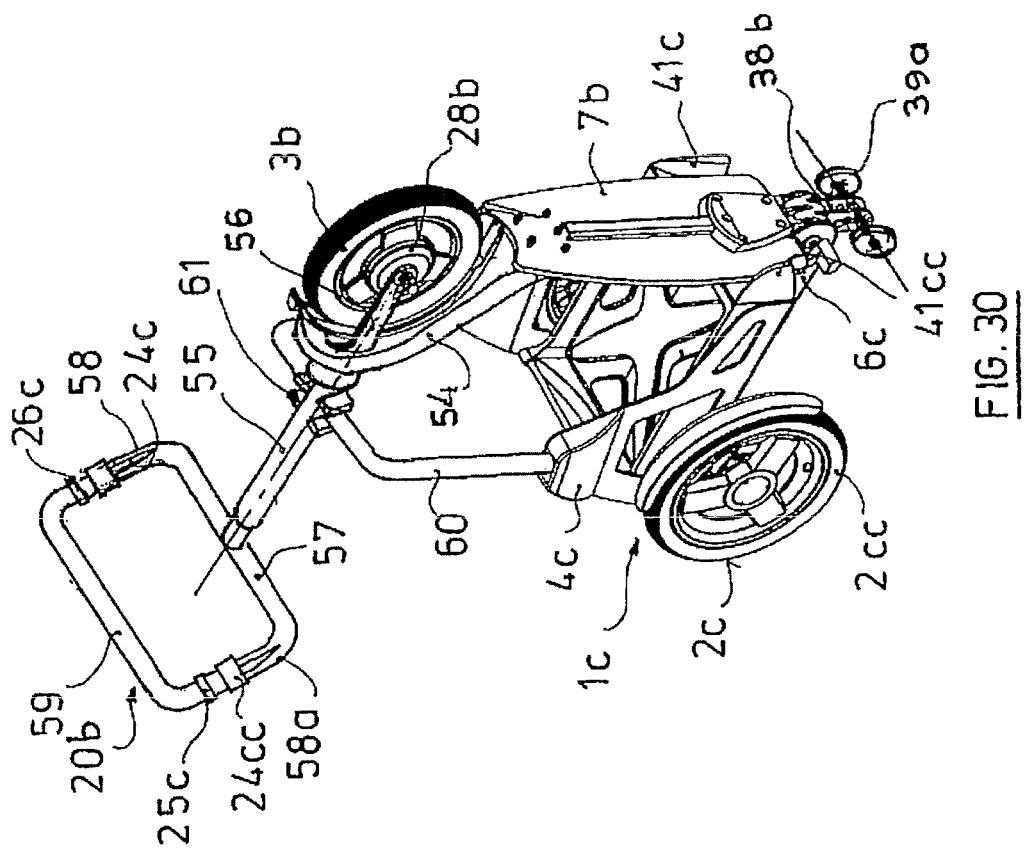
FIG. 30 shows a perspective view according to FIG. 28.

FIGS. 28 to 30 show a solution in which the rear wheel 3b is hinge-mounted on the footboard 7b in a positioning means 54 and is equipped with a handlebar 20b for steering the rear wheel. In this case, the load and transport cart 1b travels with the rear wheel 3b forward, wherein the handlebar 20b is height-adjustable and can be fixedly locked by way of the steering tube 55. The rear wheel 3b is rotatably mounted in a fork 56. The handlebar 20b is designed as a closed tubular frame, the underbar 57 of which is connected to the steering tube 55. The side bars 58 and 58a comprise two hand brakes 24c and 24cc, a bell 25a and the throttle lever 26a, the rear wheel 3b being steered via the side bars 58 and 58a. The top bar 59 of the handlebar 20b serves to permit the load and transport cart 1c to be pulled by hand when the footboard 7c is folded up (see FIG. 28).

In order to support the handlebar 20b, the loading platform 4c comprises a support arch 60 having a welded-on receptacle 61 in the center. The steering tube 55 lies in the receptacle 61 in a form-fit manner, thereby ensuring that the handlebar 20b is safely supported when the thusly designed load and transport cart 1c is pulled by the top bar 59, with a pair of support wheels 39a provided at the folding point 38b of the footboard 7c.

The advantages of the invention are that:
the steering column or the handlebar can assume two positions, namely a driving state serving as a load and transport cart and a pulling state serving as a shopping cart,
the inclination mechanism of the front wheels is simply designed,
by way of a support wheel or a pair of support wheels at the folding point of the footboard, the load and transport cart can stand on all wheels even after the footboard has been folded upward, and the load and transport cart can be pulled more easily without tilting,
the drive of the load and transport cart can be configured as all-wheel drive, front drive or rear-wheel drive, depending on the road conditions,
the load and transport cart includes a support for the driver,
the load and transport cart can be used to transport heavy purchased goods such as beverage crates and to transport persons, babies or small children.

The invention claimed is:

1. A load and transport cart in the form of a scooter, comprising at least three wheels, two of the wheels being front wheels located proximate a front of the cart and one of the wheels being a rear wheel located proximate a rear of the cart, a handlebar, a loading platform and a footboard which can be folded upward from a use position parallel to a roadway and locked in the upward folded position, wherein;
the two front wheels are equipped with an inclination mechanism for absorbing centrifugal force during cornering;
the handlbar is fixedly connected to the loading platform via two steering columns;
the cart further comprises, under the loading platform, a triangular steering plate and, below the steering plate, a front part of the footboard,
the steering plate comprises a bore, in which a round pin of the front part of the footboard is received, an annular-segment shaped groove in which a steering-pivot pin of the front part of the footboard is received and connects the front part of the footboard to the loading platform so that the footboard is rotatable about a steering axis of the cart which is more toward the front of the cart than an axis of rotation of the front wheels, an elongated hole in which a round guide pin of the loading platform is received, and two opposing fit ball heads;
wherein each of the first ball heads is received in an articulated manner in a bearing at one end of a respective one of two steering levers, said levers each have, at another end thereof, a bearing in which a respective second ball head of a respective triangular swinging fork is received, each of the front wheels being rotatably mounted on a stub axle of a respective one of the swinging forks,
each of the swinging forks is rotatably mounted on the loading platform via respective pivot pins;

whereby:
when the loading platform is deflected to the left and right about the steering axis via the handlebar, the steering plate presses via the respective first ball heads onto the respective steering levers,
and so the further second ball heads are pressed upward or downward,
and so the swinging forks are pressed upward or downward about the pivot pins and, therefore, the front wheels are pressed upward or downward by the same amount but in opposite direction,
and so the two front wheels are slanted to the left or right relative to the roadway during steering, and the steering axis, located in front of the axis of rotation of the front wheels and the front wheels can be deflected to the left or right by the steering angle of 45°.

2. The load and transport cart according to claim 1, wherein the footboard is rigidly fixable via a sliding element at the front part thereof and the upward folding of the footboard is about at least one axis member of the front part thereof, wherein the locking of footboard which has been folded upward is by way of a gas pressure spring and stops, wherein, in this state, the handlebar is shifted forward via the steering columns, wherein the handlebar comprises a hand-curve grip for gripping and a crossbar for stiffening the steering columns which are connected to one another at tops thereof via the crossbar, wherein the handlebar is steplessly height-adjustable and lockable, and wherein the footboard is adapted to be uninstalled and removed at the option of a user of the art.

3. The load and transport cart according to claim 1, wherein one or a pair of support wheels are mounted on folding points which are located below the axis members when the footboard is in the upward folded position, thereby ensuring that the cart can still stand on three or four wheels with the footboard folded up.

4. The load and transport cart according to claim 1, wherein the rear wheel is a drive wheel, comprising an electric wheel hub motor, wherein the handlebar is provided with two brake actuators and an audible warning device and a throttle lever for regulating output of the electric wheel hub motor, wherein the regulation functions by way of an acceleration sensor which measures the acceleration of the load cart only via foot thrust of a driver of the cart and switches on the wheel hub motor.

5. The load and transport cart according to claim 4, wherein each of the wheels, other than support wheels, is a drive wheel comprising an electric wheel hub motor.

6. The load and transport cart according to claim 1, wherein the rear wheel further comprises a fixedly installed first guard plate and an additional guard plate which is installed over the first guard plate and is supported via a rod assembly such that the additional guide plate is rotatable about a rear wheel axle and so a tire of the rear wheel is covered by swiveling the additional guard plate when the footboard is folded upward.

7. The load and transport cart according to claim 1, further comprising a foldable and height-adjustable support for supporting a driver, wherein the support is comprised of a U-shaped arch having two legs and a backrest or saddle centered in the arch, and two tubular bars in which the legs are slidable, height-adjustable and lockable, wherein the tubular bars are rotatably supported in bearing blocks which are fixedly mounted on the footboard, and wherein the tubular bar are fixed when in a vertical position and when in a folded position.

8. The load and transport cart according to claim 1, wherein only the two front wheels are drive wheels each comprising an electric wheel hub motor, and the cart further comprises electronics for effecting slower rotation of an inner wheel of the two front wheels than a outer wheel of the two front wheels as the cart is steered around a curve.

9. The load and transport cart according to claim 1, further comprising only one motor driving both of the font wheels via a differential gearbox.

10. The load and transport cart according to claim 1, wherein a surface of a cover for one or more rechargeable batteries mounted on the cart comprises a loading surface of the loading platform.

11. The load and transport cart according to claim 10, wherein the loading surface and free space thereabove are sized to receive and support one beverage crate or two beverage crates stacked one on top of the other.

12. The load and transport cart according to claim 10, further comprising a shopping bag sized to be placed on the loading surface and self-foldable via spring wire and having two handles which can be hung on two respective hooks located on the two respective steering columns elevation of the hooks on the steering columns being infinitely variable via adjustable and lockable sliding elements.

13. The load and transport cart according to claim 10, further comprising a baby basket or a seat for a small child which baby basket or seat is installable on the loading surface.

\* \* \* \* \*